United States Patent [19]

Rivetti et al.

[11] 4,203,631

[45] May 20, 1980

[54] HYDRAULIC SERVO-ASSISTED BRAKING SYSTEM FOR MOTOR VEHICLES

[75] Inventors: Enrico Rivetti, Turin; Giuseppe Amedei, Modena; Antonino Bertone, Vercelli, all of Italy

[73] Assignee: Centro Ricerche Fiat S.p.A., Orbassano, Italy

[21] Appl. No.: 742

[22] Filed: Jan. 3, 1979

[30] Foreign Application Priority Data

Jan. 4, 1978 [IT] Italy ............................ 67002 A/78

[51] Int. Cl.² .......................................... B60T 13/16
[52] U.S. Cl. ....................................... 303/52; 60/548
[58] Field of Search ................. 60/548, 555, 591; 303/6 R, 9, 10, 50, 52

[56] References Cited

U.S. PATENT DOCUMENTS

| | | | |
|---|---|---|---|
| 3,208,802 | 9/1965 | Thirion | 303/52 X |
| 4,123,908 | 11/1978 | Bertone et al. | 60/548 |

Primary Examiner—Duane A. Reger
Attorney, Agent, or Firm—Sughrue, Rothwell, Mion, Zinn and Macpeak

[57] ABSTRACT

A hydraulic servo-assisted braking system for motor vehicles has a master cylinder controlling two independent braking circuits through respective auxiliary cylinders each having an auxiliary piston with a central bore and an associated servo-piston with a stem which closes the said bore upon displacement of the servo-piston by hydraulic fluid pressure of source circuit, separable from the master cylinder, applied to the servo-piston through a common interception valve which is opened to admit the source pressure to the servo-pistons upon movement of either or both of a pair of pistons in a modulator cylinder subjected to the respective hydraulic pressures in the two brake actuator circuits. Failure of one of the braking circuits allows the other to remain operative, while damage to the servo-cylinders allows braking to remain effective through the master cylinder.

6 Claims, 2 Drawing Figures

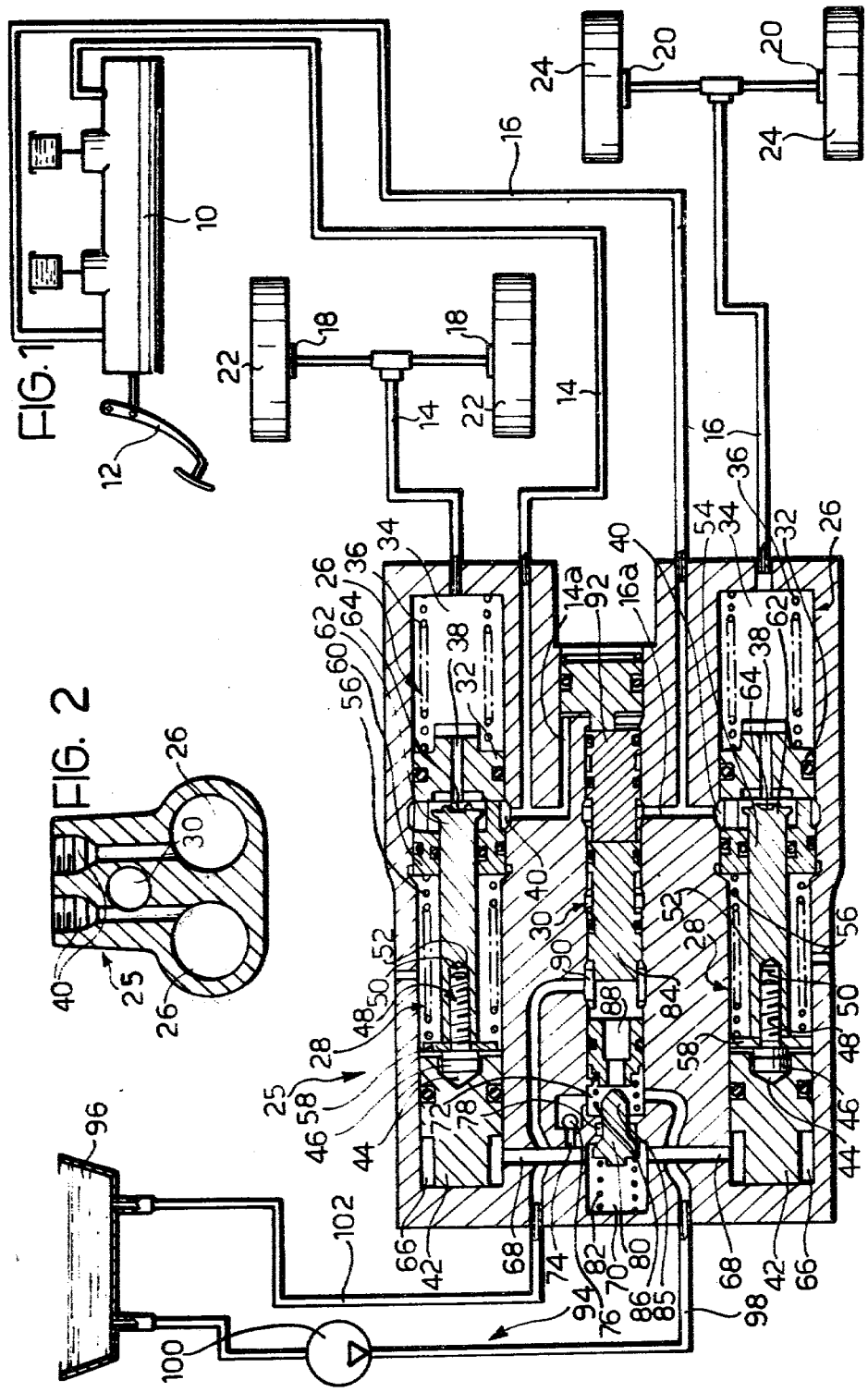

HYDRAULIC SERVO-ASSISTED BRAKING SYSTEM FOR MOTOR VEHICLES

The present invention relates to a hydraulic servo-assisted braking system for motor vehicles.

One known type of hydraulic servo-assisted braking system is described in the Applicants' Italian Patent Application No. 69786-A/75 and includes a master cylinder, operatively associated with a brake pedal and adapted to act upon two separate braking circuits, and a servo device which produces a force which is added to that exerted by the brake pedal, this force being obtained by the action on the pistons of the master cylinder, or preferably on a composite piston having two diameters, of the pressure generated in an auxiliary circuit including a pump and possibly also a pressure accumulator and a pressure modulator controlled by the pressure in the compression chambers of the master cylinder.

This known system allows the use of liquids with different characteristics in the pump circuit in the hydraulic circuits connected to the brakes of the wheels, but is has the disadvantage that the servo device must necessarily be connected to the master cylinder, increasing its axial size, which is in any case significant due to the fact that it is a cylinder which controls two separate braking circuits.

A further disadvantage of such a known system lies in the fact that in order for the pressure generated in the auxiliary circuit to act on a sufficiently extensive area, it is necessary for manufacturing reasons, for the pistons of the master cylinder to have a considerable diameter. In consequence, in conditions when the braking is, for some reason, not servo-assisted, it is necessary to exert a considerable force on the brake pedal to effect braking.

Another known servo-assisted braking system, described in U.S. Pat. No. 3,729,931, comprises a master cylinder the compression chamber of which is connected to the brake actuator cylinders associated with the wheels on an axle of the vehicle through an auxiliary cylinder in which there is mounted for sealed sliding movement, against the action of a return spring, an auxiliary piston provided with a central through bore and connected to a chamber in which a small piston is slidable, the displacement of the small piston, under the action of the pressure transmitted from said compression chamber and against the action of a spring, connecting a generator of liquid pressure to a servo-cylinder containing a piston having a stem which extends into said auxiliary cylinder so as to close, during its advance, the central bore of said auxiliary piston, leaving the said bore open when the said piston is in the rest position. In use of the system the servo-cylinder is connected to an outlet which communicates with the hydraulic circuit of the brakes of the rear wheels of the vehicle on which the system is mounted, the outlet from the auxiliary cylinder being connected to the hydraulic circuit of the brakes of the front wheels.

This second known system has the serious disadvantage that the same oil necessarily acts in the braking circuit of the rear wheels and in the pump circuit, thus greatly reducing the reliability of the said brakes. Moreover, in the event of failure of one of the two braking circuits, the other circuit is operable with a reduced pressure relative to that available, in a similar situation, in the known system described previously.

Finally, in this case also, it is not possible to locate the master cylinder at a distance from the servo-cylinder and the auxiliary cylinder, because in the event of failure of the braking circuit acting on the rear wheels, it would not even be possible to operate the rear brakes, with very serious consequences.

The object of the present invention is the provision of a hydraulic servo-assisted braking system for motor vehicles, having a high degree of safety and reliability, with a reduced axial size, and in which the master cylinder can be spaced from the servo-cylinder and the auxiliary cylinder.

According to the present invention there is provided a hydraulic servo-assisted braking system for motor vehicles comprising a master cylinder having a compression chamber connected to the brake actuator cylinders of the wheels on an axle of the vehicle through an auxiliary cylinder in which an auxiliary piston is mounted for fluid-tight sliding movement against the action of a return spring, the auxiliary piston having a central through bore, the compression chamber of the master cylinder being also connected to a chamber in which a piston is sealingly slidable for displacement under the action of the pressure in said compression chamber, against the action of a spring, to connect a source of hydraulic fluid under pressure to a servo-cylinder containing a piston the stem of which extends within the auxiliary cylinder so as to close during said displacement the central bore of each said auxiliary piston, leaving this bore open when the piston of the servo-cylinder is in its retracted rest position, characterised in that the system comprises the following combination of elements individually known per se:

a master cylinder of the type controlling two separate braking circuits connected to the brake actuator cylinders of the respective pairs of wheels on two respective axles of the vehicle, through respective auxiliary cylinders in which respective auxiliary pistons are slidable sealingly, against the action of respective return springs, the auxiliary pistons each having a central through bore;

a respective said servo-cylinder arranged coaxially with each respective auxiliary cylinder and having a respective servo-piston fluid-tightly slidable within it against the action of a spring, the servo-piston having a stem extending within the associated auxiliary cylinder, said stem having an end which cooperates with the through bore in associated auxiliary piston to close said bore upon displacement of the said servo-piston against the action of said spring, said end of the stem being spaced from said auxiliary piston when the servo-piston is in a rest position, and the chambers of the servo-cylinders on the opposite sides of the respective sero-pistons from the stems being connectable to the source of hydraulic fluid under pressure through an interception valve which is urged in the direction of closure by elastic means, and a pair of pistons, each subjected to the pressure which acts during braking in one of the two braking circuits connected to the master cylinder, said pistons acting acting on the said interception valve to move the latter against the action of said elastic means.

Compared with the first known hydraulic braking system described above, the braking system of the present invention has the advantage of reduced size and weight since the master cylinder can be separate from the servo-device; moreover, the system requires a much smaller braking effort in the event of failure.

Compared with the second known hydraulic braking system, the system of the present invention has the advantage that it allows the use in the hydraulic circuits of the wheel brakes of a different oil from that contained in the pump circuit.

A further advantage of the present invention lies in the fact that, in the event of failure of one of the circuits connected to the master cylinder, the other braking circuit remains operable for servo-braking, while in the event of damage to the servo system, braking is still possible through both circuits through the pressure generated in the master cylinder. The present invention therefore affords a greater degree of braking efficiency in the event of breakdown.

Further advantages and characteristics will appear from the description which follows, with reference to the accompanying drawings, given by way of non-limiting example, wherein:

FIG. 1 is a schematic view in partial longitudinal section of a hydraulic servo-assisted braking system according to one embodiment of the invention, and FIG. 2 is a simplified schematic view in transverse section of a servo device forming part of the system illustrated in FIG. 1.

In the drawings reference numeral 10 indicates generally a master cylinder operatively associated with a brake pedal 12 and connected hydraulically to two independent hydraulic circuits 14, 16. The hydraulic circuits 14, 16 lead, through a servo device 25 separate from the master cylinder 10, to the respective pairs of brake actuator cylinders 18, 20 of the two pairs of wheels 22, 24 respectively associated with the two axles of a motor vehicle.

The servo device 25 comprises a pair of parallel auxiliary cylinders 26, a pair of parallel servo-cylinders 28, each connected coaxially to the respective auxiliary cylinder 26, and a pressure modulator cylinder 30 disposed between the auxiliary cylinders 26 in a common housing with the latter.

One arrangement of the bores forming the auxiliary cylinders 26 and the modulator cylinder 30 in the servo device 25 is illustrated diagrammatically in FIG. 2.

Each auxiliary cylinder 26 is provided internally with an auxiliary piston 32 slidable sealingly, against the action of a respective return spring 36, inside a compression chamber 34, which communicates hydraulically with the associated pair of brake actuator cylinders 18, 20 respectively. Each auxiliary piston 32 has a central through bore 38, which puts the compression chamber 34 into communication with a chamber 40, communicating with the associated braking circuit 14, 16 respectively connected to the master cylinder 10.

Inside each servo-cylinder 28 a respective servo-piston 42 is slidable sealingly. One end of the piston 42 has a seat 44 within which is housed the head 46 of a screw 48, having a threaded shank 50 screwed into a threaded blind bore 52 formed in one end of a stem 54 of reduced diameter compared with the piston 42. Sliding movement of each stem 54 inside the respective servo-cylinder 28 is controlled by the respective servo-piston 42, against the action of a biassing spring 56 which reacts elastically between an annular end collar 58 fixed to the stem 54, and a centering bush 60 within the respective auxiliary cylinder 26. The end of the stem 54 opposite the servo-piston 42 passes sealingly through the centering bush 60 and has a radial end flange 62 provided centrally with a shallow recess 64 having a diameter greater than the central bore 38 of the adjacent auxiliary piston 32.

Each servo-cylinder 28 has, in correspondence with the end of the respective servo-piston 42 opposite the stem 54, a chamber 66 which communicates through a duct 68, with a distribution chamber 70, situated at one end of the modulator cylinder 30. The chamber 70 communicates with a second chamber 72 through a branch duct 74 which includes a non-return valve 76. The chambers 70 and 72 are furthermore interconnected by a passage 78 which is traversed axially by an interception valve 80. The interception valve 80 is slidable against the action of a spring 82 reacting elastically between one end of said valve 80 and an adjacent end wall of the said chamber 70. The opposite end 85 of the interception valve 80 has a conical external surface, and is adapted to make sealing engagement with a central bore 88 in a first piston 84 of the modulator cylinder 30, slidable sealingly in the bore of the modulator against the action of a compression spring 86. The central bore 88 of the piston 84 communicates with an annular chamber 90 in the bore of the modulator cylinder 30.

Reference numeral 92 shows a second piston, slidable fluid-tightly inside the bore of the modulator cylinder 30, disposed at the end of the piston 84 opposite the bore 88. The pressure face of each piston 84, 92 is in communication respectively with a branch duct 14a, 16a connected to the braking circuits 14, 16 respectively.

The modulator cylinder 30 is connected to a source of liquid under pressure, indicated generally by 94, comprising a tank 96, a volumetric pump 100 and a delivery pipe 98 which opens into the chamber 72. A discharge pipe 102 communicates with the annular chamber 90 and is connected to the tank 96. The hydraulic fluid pressure source 94 is completely separate from the hydraulic braking circuits 14 and 16.

The operation of the braking system will now be described.

When the driver operates the brake pedal 12 a pressure is generated in the master cylinder 10, as shown per se. This pressure acts on the hydraulic fluid contained in the two braking circuits 14, 16. The hydraulic fluid under pressure, passing through the chamber 40 and the central bore 38 of each auxiliary piston 32, enters the compression chamber 34 of each auxiliary cylinder 26 and thence passes to the brake actuator cylinders 18, 20 of each pair of wheels.

At the same time, the hydraulic fluid under pressure in the braking circuits 14, 16 enters the modulator cylinder 30 through the branch ducts 14a, 16a and is applied to bases of the pistons 92 and 84, causing displacement of the pistons 92 and 84, to the left as viewed in FIG. 1, against the action of the spring 86. This results in closure of the bore 88 of the piston 84 by the conical end 85 of the interception valve 80. In this way the hydraulic fluid in the delivery pipe 98 is prevented from passing into the discharge pipe 102, creating a servo pressure in the chamber 72. The fluid under pressure in the chamber 72, together with the force imparted by the pistons 84, 92 causes displacement of the interception valve 80, against the action of its return spring 82, so that the hydraulic fluid under pressure flows into the distribution chamber 70 and through the ducts 68 into the chamber 66 of each of the two servo-cylinders 28. The hydraulic pressure in the chambers 66 cause sliding of the servo-pistons 42, and the stems 54, to the right as viewed in FIG. 1, bringing the end flanges 62 of each stem into engagement with the respective auxiliary piston 32 and sealing the bore 38 in the piston 32. In this way each auxiliary piston 32 is subjected to a servo force due to the thrust of the servo-piston 42 which pressurizes the hydraulic fluid in the chamber 40 and augments the force due to the fluid under pressure in the chamber 40 supplied by the master cylinder 10.

Upon release of the brake pedal 12, the effect of the fall in pressure and the elastic reaction of the springs 36 and 56 causes sliding of the servo-piston 42 in the opposite direction to that previously described, opening the bore 38 of each servo-piston 32, so that the hydraulic fluid in the braking circuits 14, 16 flows towards the master cylinder 10, relieving the pressure in the brake actuator cylinders 18, 20. At the same time, due to the effect of the fall of pressure in the modulator cylinder 30, and the reaction of the spring 86 and 82 respectively, the pistons 84 and 92 return to their rest positions, and the interception valve 80 closes the passage between the distribution chamber 70 and the chamber 72. The hydraulic fluid in the circuit of the source 94 then flows from the chamber 66 into the distribution chamber 70 and through the branch duct 74, the bore 88 and the annular chamber 90, returning via the discharge pipe 102 to the tank 96.

In the event of failure or breakdown, the hydraulic servo-assisted braking system described above affords a considerable degree of safety and reliability, and maintains a high degree of braking efficiency. Thus, in the event of damage to one of the braking circuits which branch from the master cylinder 10, for example, the circuit 14, the other braking circuit 16 remains effective, with its servo-assistance still operative due to the action of the piston 84 alone, the piston 92 being inoperative.

On the other hand, in the event of damage to the modulator cylinder 30 or the fluid pressure source, due for example to leakage or a breakdown of the volumetric pump 100, braking remains effective in both braking circuits 14, 16 thanks to the pressure generated in the master cylinder 10, but without servo-assistance. The force which must be exerted on the brake pedal 12 is relatively limited, due to the reduced size of the master cylinder 10.

The reliability of the hydraulic braking system as described is further increased by the fact that the hydraulic braking circuits 14, 16 and the circuit of the source 94 of the hydraulic fluid under pressure are completely separate from each other. This allows the use, in these circuits, or different hydraulic fluids adapted to the specific purposes of the circuits. For example, mineral oil may be used in the circuit of the source 94 and non-hygroscopic vegetable oil in the two braking circuits 14, 16.

We claim:

1. Hydraulic servo-assisted braking system for motor vehicles, of the type comprising: a master cylinder; an auxiliary cylinder having an auxiliary piston mounted for fluid-tight sliding movement therein, and return spring means acting on the auxiliary piston, said auxiliary piston having a central through bore, brake actuator cylinders associated with the wheels on an axle of the vehicle and connected to said master cylinder through said auxiliary cylinder; a cylinder connected to the master cylinder in which a piston is sealingly slidable for displacement under the action of the pressure in said master cylinder chamber, and biassing spring means acting on said piston; a source of hydraulic fluid under pressure; a servo-cylinder containing a servo-piston having a stem which extends within the auxiliary cylinder so as to close, upon displacement of said servo-piston, the central bore of the said auxiliary piston, said servo-piston leaving said bore open when in its retracted rest position in the servo-cylinder;

wherein the improvements comprise the following elements in combination:

a master cylinder of the type controlling two separate braking circuits connected to the brake actuator cylinders of the respective pairs of wheels on two respective axles of the vehicle, through respective said auxiliary cylinders, wherein the respective auxiliary pistons are slidable sealingly against the action of respective return springs, the auxiliary pistons each having a central through bore;

a respective said servo-cylinder arranged coaxially with each respective auxiliary cylinder and having a respective said servo-piston fluid-tightly slidable within it against the action of a spring, the servo-piston having a stem extending within the associated auxiliary cylinder, said stem having an end which cooperates with the through bore in the associated auxiliary piston to close said bore upon displacement of the said servo-piston against the action of said spring, said end of the stem being spaced from said auxiliary piston when the servo-piston is in a rest position;

an interception valve for connecting the ends of the servo-cylinders, on the opposite sides of the respective servo-pistons from the stems, to the source of hydraulic fluid under pressure, and resilient means for urging said interception valve in the direction of closure, and a pair of pistons, each subjected to the pressure which acts during braking in one of the two braking circuits circutis, connected to the master cylinder, said pistons acting on said interception valve to move the latter against the action of said resilient means.

2. Hydraulic servo-assisted braking system according to claim 1, wherein the source of hydraulic fluid under pressure comprises a delivery pipe, a tank connected to the delivery pipe, volumetric pump means in said delivery pipe, and a discharge pipe, and wherein the system further includes a modulator cylinder for modulating the fluid pressure in said chambers of the servo-cylinders opposite the respective stems, said modulator cylinder containing the said interception valve, and two pistons which are slidable coaxially, during braking, and which act in tandem, the pistons being movable towards the interception valve by the effect of the pressure acting in respective branch ducts of each braking circuit communicating with respective pressure faces of the said pistons, and a return spring acting on said pistons.

3. Hydraulic servo-assisted braking system according to claim 2, wherein the auxiliary cylinders, the servo-cylinders and the modulator cylinder are interconnected and wherein the master cylinder is spaced from the modulator cylinder and connected hydraulically through the separate braking circuits to respective chambers within the respective auxiliary cylinders in correspondence with the pressure faces of the respective auxiliary pistons.

4. Hydraulic servo-assisted braking system according to claim 2, wherein the interception valve comprises a substantially cylindrical body having a substantially conical end facing the end of one of the said pistons; said valve being interposed between a distribution chamber hydraulically connected to the said chambers of the servo-cylinders, and a second chamber connected to the delivery pipe and, through an axial bore in the end of the piston facing the interception valve, to the discharge pipe of the fluid source; said interception valve being effective, upon displacement of said piston during braking, to close the said axial bore and to slide axially, against the action of said resilient means so as to put the distribution chamber into communication with the second chamber.

5. Hydraulic servo-assisted braking system according to claim 4, wherein the first distribution chamber and the second chamber are interconnected through a duct having a non-return valve adapted to allow the flow of hydraulic fluid from the distribution chamber into the second chamber.

6. Hydraulic servo-assisted braking system according to claim 1, wherein the two braking circuits controlled by the master cylinder lead respectively to the brake actuator cylinders of the wheels on two respective axles of the vehicle, these circuits being separate from the hydraulic circuit of the source of fluid under pressure.

* * * * *